(12) United States Patent
van de Bruggen et al.

(10) Patent No.: US 9,851,874 B2
(45) Date of Patent: Dec. 26, 2017

(54) PERSONALIZED WEBPAGE FEATURE TOURING SYSTEM

(71) Applicant: Microsoft Technology Licensing, LLC, Redmond, WA (US)

(72) Inventors: Hans van de Bruggen, San Jose, CA (US); Matthew David Shoup, San Jose, CA (US); Gordon Koo, San Mateo, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 550 days.

(21) Appl. No.: 13/870,337

(22) Filed: Apr. 25, 2013

(65) Prior Publication Data

US 2014/0325398 A1 Oct. 30, 2014

Related U.S. Application Data

(60) Provisional application No. 61/815,600, filed on Apr. 24, 2013.

(51) Int. Cl.
*G06F 3/0484* (2013.01)
*G06F 9/44* (2006.01)

(52) U.S. Cl.
CPC .......... *G06F 3/0484* (2013.01); *G06F 9/4446* (2013.01)

(58) Field of Classification Search
CPC ................ G06F 9/4446; G06F 3/0481–3/0483
USPC ....................................................... 715/760
See application file for complete search history.

(56) References Cited

U.S. PATENT DOCUMENTS

| | | | | |
|---|---|---|---|---|
| 5,496,177 | A  * | 3/1996 | Collia | G06F 9/4446 434/118 |
| 6,489,968 | B1 * | 12/2002 | Ortega et al. | 715/713 |
| 8,535,059 | B1 * | 9/2013 | Noble et al. | 434/219 |
| 8,554,640 | B1 * | 10/2013 | Dykstra et al. | 705/26.7 |
| 2002/0015056 | A1 * | 2/2002 | Weinlaender | G06F 9/4446 715/705 |
| 2004/0088273 | A1 * | 5/2004 | Mutsuno | G06F 9/4446 706/45 |
| 2004/0109030 | A1 * | 6/2004 | Farrington | G06F 9/4446 715/808 |
| 2007/0025311 | A1 * | 2/2007 | Jeong et al. | 370/338 |
| 2007/0277104 | A1 * | 11/2007 | Hennum et al. | 715/705 |

(Continued)

*Primary Examiner* — Jennifer To
*Assistant Examiner* — Liang Li
(74) *Attorney, Agent, or Firm* — Schwegman Lundberg & Woessner, P.A.

(57) ABSTRACT

Techniques for generating and providing personalized interactive tours of various features of a webpage are described. According to various embodiments, it may be determined that a device associated with a user is accessing a webpage including various webpage features. Personalized experience scores corresponding to the webpage features may be calculated. Each of the personalized experience scores may indicate a current experience level of the user with the corresponding webpage feature. Thereafter, a specific webpage feature may be identified, where the personalized experience scores indicate that the user has a relatively low current experience level with that specific webpage feature. A user-selectable tour entry user interface element may be displayed on the webpage, wherein the tour entry user interface element includes a link to an interactive tour describing the specific webpage feature.

18 Claims, 16 Drawing Sheets

(56) References Cited

U.S. PATENT DOCUMENTS

| | | | |
|---|---|---|---|
| 2010/0088601 A1* | 4/2010 | Teunen | G06F 9/4446 715/714 |
| 2011/0302117 A1* | 12/2011 | Pinckney | G06Q 30/02 706/12 |
| 2013/0086498 A1* | 4/2013 | Eskander | 715/765 |
| 2013/0097497 A1* | 4/2013 | Matejka | G06F 3/048 715/705 |
| 2014/0115459 A1* | 4/2014 | Norwood | 715/708 |
| 2014/0181652 A1* | 6/2014 | Stanke et al. | 715/708 |
| 2014/0298162 A1* | 10/2014 | Cohen et al. | 715/234 |

* cited by examiner

400

401 Share an update...

402

Matthew Shoup has a new connection
John Smith
Associate at ABC
26 minutes ago

Hans van de Bruggen skills and experience were endorsed by John Smith
Hans was endorsed for User Experience Design
1 hour ago 4 people have new connections
1 hour ago Gordon Koo has an updated profile
XML, JSON
2 hours ago Matthew Shoup is now following
LINKEDIN
3 hours ago PEOPLE YOU MAY KNOW — 403
John Smith
Jane Doe
Jim Sample WHO'S VIEWED YOUR PROFILE — 404
11 Your profile has been viewed by 11 people in the past 7 days
10 You have shown up in search results 10 times in the past 15 days JOBS YOU MAY BE INTERESTED IN — 405
Software Engineer
Experience Designer
UI Designer COMPANIES YOU MAY WANT TO FOLLOW — 406
LinkedIn
SlideShare
Pulse GROUPS YOU MAY LIKE — 407
Bay Area Engineers
SF Experience Designers

*Fig. 4*

| WEBPAGE | WEBPAGE FEATURE | RELEASE DATE | INTERACTIVE TOUR |
|---|---|---|---|
| www.linkedin.com | Activity Stream<br>Share an update<br>People you may know<br>Who's viewed your profile<br>... | 1/1/10 13:00<br>1/1/11 12:00<br>1/1/10 0:00<br>1/1/11 4:00<br>... | link_tour1<br>link_tour2<br>link_tour3<br>link_tour4<br>... |
| www.linkedin.com/profile | ... | ... | ... |
| www.linkedin.com/help | ... | ... | ... |

*Fig. 5*

PEOPLE YOU MAY KNOW (?) — 701

John Smith
Jane Doe
Jim Sample

WHO'S VIEWED YOUR PROFILE (?) — 702

11 Your profile has been viewed by 11 people in the past 7 days

10 You have shown up in search results 10 times in the past 15 days

JOBS YOU MAY BE INTERESTED IN

Software Engineer
Experience Designer
UI Designer

COMPANIES YOU MAY WANT TO FOLLOW (?) — 703

LinkedIn
SlideShare
Pulse

GROUPS YOU MAY LIKE

Bay Area Engineers
SF Experience Designers

---

Share an update...

Matthew Shoup has a new connection

John Smith
   Associate at ABC 26 minutes ago

Hans van de Bruggen skills and experience were endorsed by John Smith

Hans was endorsed for User Experience Design 1 hour ago 4 people have new connections 1 hour ago

Gordon Koo has an updated profile

XML, JSON 2 hours ago

Matthew Shoup is now following

LINKEDIN 3 hours ago

| STEP 1 OF 3 | |
|---|---|
| URL | http://www.linkedin.com |
| Co-ordinates on page | [x1,y1] |
| Caption Properties | Property 1, Property 2,... |
| Caption Title | Title 1 |
| Caption Comment | Comment 1 |
| STEP 2 OF 3 | |
| URL | http://www.linkedin.com/... |
| Co-ordinates on page | [x2,y2] |
| Caption Properties | Property 3, Property 4,... |
| Caption Title | Title 2 |
| Caption Comment | Comment 2 |
| STEP 3 OF 3 | |
| URL | http://www.linkedin.com/... |
| Co-ordinates on page | [x3,y3] |
| Caption Properties | Property 5, Property 6,... |
| Caption Title | Title 3 |
| Caption Comment | Comment 3 |

*Fig. 8*

USER INTERACTION HISTORY DATA

| USER | DATE/TIME | URL | INTERACTION |
|---|---|---|---|
| User 1 | 1/1/13 1:00<br>1/2/13 2:00<br>1/3/13 3:00<br>1/4/13 4:00<br>1/5/13 5:00<br>1/6/13 6:00 | www.linkedin.com/...<br>www.linkedin.com/...<br>www.linkedin.com/...<br>www.linkedin.com/...<br>www.linkedin.com/...<br>www.linkedin.com/... | ...feature 1....<br>...feature 2....<br>...tour A....<br>...feature 4....<br>...tour B....<br>...tour C.... |
| User 2 | ... | ... | ... |
| User 3 | ... | ... | ... |

PERSONALIZED WEBPAGE FEATURE TOURING SYSTEM

RELATED APPLICATIONS

This patent application claims the benefit of priority to U.S. Provisional Patent Application Ser. No. 61/815,600, filed on Apr. 24, 2013, which is incorporated herein by reference in its entirety.

TECHNICAL FIELD

The present application relates generally to data processing systems and, in one specific example, to techniques for generating and providing personalized interactive tours of various features of a webpage.

BACKGROUND

Online social networking services are becoming increasingly popular, with many such services boasting millions of active users. Social network services often include a number of different webpages, such as a homepage, a news page, user profile pages, group pages, a help page, and so on. Each of these webpages may include different types of features or content.

BRIEF DESCRIPTION OF THE DRAWINGS

Some embodiments are illustrated by way of example and not limitation in the figures of the accompanying drawings in which:

FIG. 4 illustrates an exemplary webpage including various webpage features, according to various embodiments;

FIG. 5 illustrates exemplary webpage feature information, according to various embodiments;

FIG. 7 illustrates an exemplary webpage and exemplary user-selectable tour entry user interface elements, according to various embodiments;

FIG. 8 illustrates exemplary tour metadata, according to various embodiments;

FIG. 10 illustrates exemplary user interaction history data, according to various embodiments;

DETAILED DESCRIPTION

Figure 1:
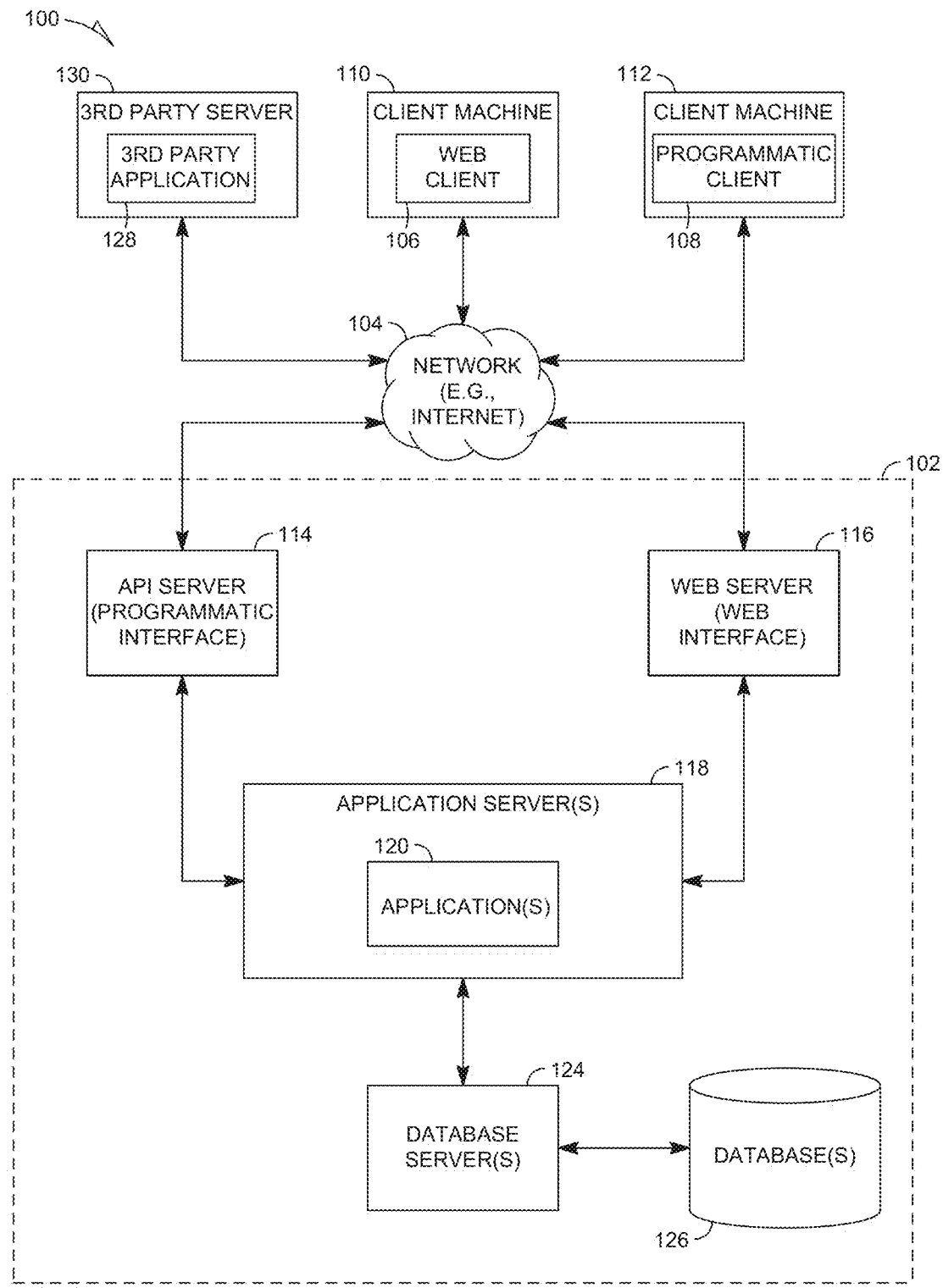
FIG. 1 is a block diagram showing the functional components of a social networking service, consistent with some embodiments of the invention.

Example methods and systems for generating and providing personalized interactive tours of various webpage features are described. In the following description, for purposes of explanation, numerous specific details are set forth in order to provide a thorough understanding of example embodiments. It will be evident, however, to one skilled in the art that the present invention may be practiced without these specific details.

Various techniques for helping users learn about different features of a webpage are provided. According to various exemplary embodiments, when a user views a webpage that includes various webpage features, a series of tour entry buttons may be displayed in conjunction with the webpage features. The tour entry buttons may serve as entry points to further information describing each of the webpage features. For example, each of the tour entry buttons may act as an entry point or anchor point for an interactive tour that describes each of the webpage features.

According to various exemplary embodiments, each user's familiarity or experience level with various webpage features of a webpage may be inferred or estimated. Tour entry buttons may then be selectively displayed for the webpage features that the user is less experienced with, whereas tour entry buttons for webpage features that the user is more experienced with may be removed. In other words, when a given user views a webpage at a given time, the most relevant or important features for that particular user to learn about at that particular point in time may be determined, and tour entry buttons for accessing further information about these webpage features may be selectively displayed. Thus, when different users view the same webpage, each user may be presented with different entry points for accessing knowledge concerning features about which they personally don't have experience.

In some embodiments, tour entry buttons may be displayed for webpage features that are relatively new, such as webpage features that were introduced in the last day, week, or month. For example, it may be inferred that the user has a lower level of experience with a newer webpage feature, and tour entry button may be displayed for this new webpage feature. In some embodiments, tour entry buttons may be displayed for webpage features that the user has not previously accessed. In some embodiments, tour entry buttons may be displayed for webpage features that the user has not recently accessed (e.g., even though the user has accessed the feature before, the user may not have accessed it in the last six months or the last year). In some embodiments, tour entry buttons may be displayed for webpage features, if these webpage features have tours that the user has not previously accessed or recently accessed. In some embodiments, tour entry buttons may be displayed for webpage features that are related to some user profile attribute of the user. For example, if the user has an experience attribute indicating that the user is an engineer, then tour entry buttons may be displayed for a webpage feature that is especially applicable or suitable for engineers, such as a webpage feature allowing engineers to add engineering publications to their profile page.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may be implemented on or executed by one or more of the modules of the system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
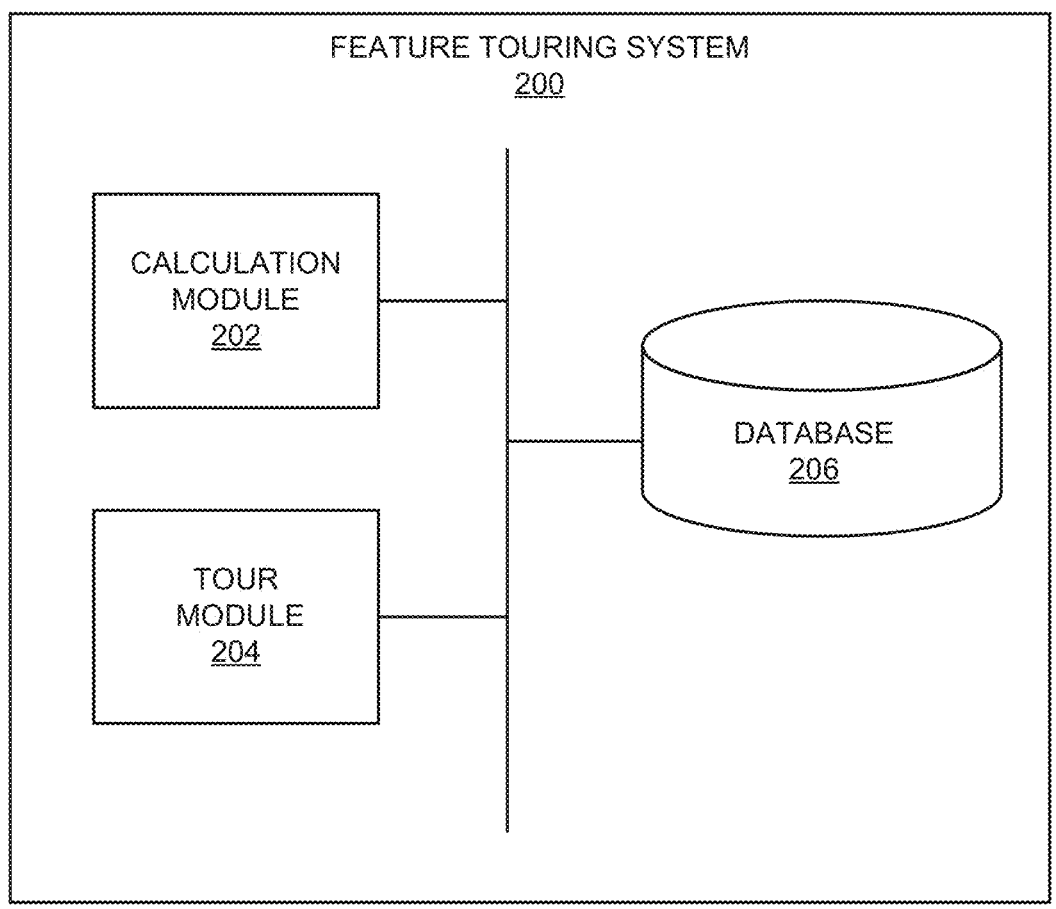
FIG. 2 is a block diagram of an example system, according to various embodiments.

Turning now to FIG. 2, a feature touring system 200 includes a calculation module 202, a tour module 204, and a database 206. The modules of the feature touring system 200 may be implemented on or executed by a single device such as a feature touring device, or on separate devices interconnected via a network. The aforementioned feature touring device may be, for example, one of the client machines (e.g. 110, 112) or application server(s) 118 illustrated in FIG. 1.

Figure 3:
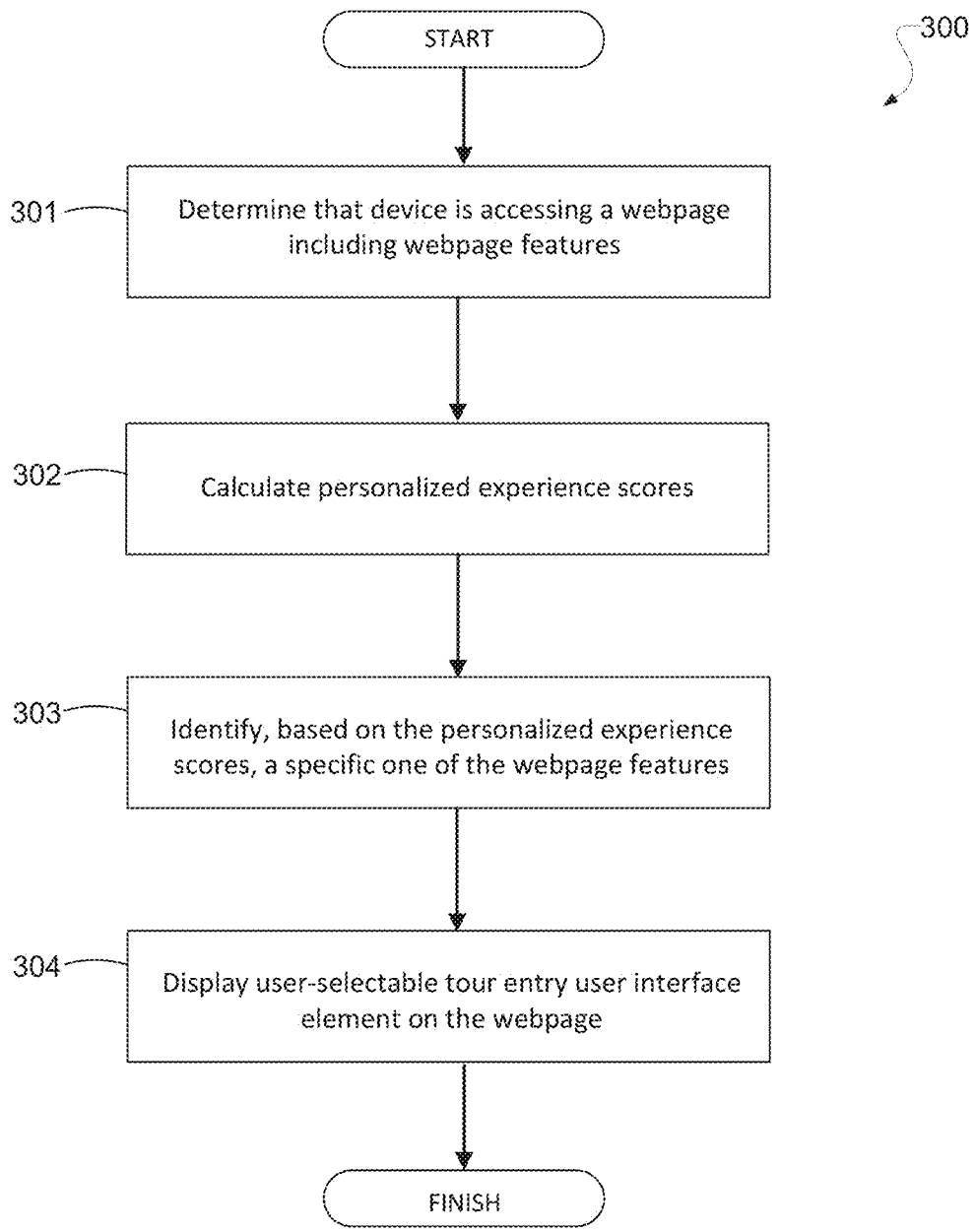
FIG. 3 is a flowchart illustrating an example method, according to various embodiments.

FIG. 3 is a flowchart illustrating an example method 300, according to various exemplary embodiments. The method 300 may be performed at least in part by, for example, the feature touring system 200 illustrated in FIG. 2 (or an apparatus having similar modules, such as client machines 110 and 112 or application server 118 illustrated in FIG. 1). Operations 301-304 in the method 300 will now be described briefly. In operation 301, the calculation module 202 determines that a device associated with a user is accessing a webpage including various webpage features. In operation 302, the calculation module 202 calculates a plurality of personalized experience scores corresponding to the plurality of webpage features. For example, each of the personalized experience scores may indicate a current experience level of the user with the corresponding webpage feature. In operation 303, the calculation module 202 identifies, based on the personalized experience scores, a specific one of the webpage features. For example, the specific webpage feature may be selected because the personalized experience scores indicate that the user has a relatively low current experience level with the specific webpage feature. In operation 304, the tour module 204 displays the webpage, as well as a user-selectable tour entry user interface element on the webpage. The tour entry user interface element may include a link to an interactive tour describing the specific webpage feature. Each of the aforementioned operations 301-304, and each of the aforementioned modules of the feature touring system 200, will now be described in greater detail.

Referring back to FIG. 3, in operation 301, the calculation module 202 determines that a device associated with a user is accessing a webpage, where the webpage may include various webpage features. The aforementioned webpage may be any type of webpage or website that includes various webpage features, such as a home page or user profile page of a social network service such as LinkedIn®. According to various exemplary embodiments, a webpage feature may be any feature, component, element, section, portion, area, or piece of functionality of a webpage. For example, FIG. 4 illustrates an exemplary webpage 400 that corresponds to a homepage of a social network service (such as LinkedIn®) that is displayed when a particular user "Jane Doe" logs into the social network service. As illustrated in FIG. 4, the home page 400 includes various webpage features, such as a profile update feature 401 (that enables the user to post an update viewable by other users of the social network service), a network update stream 402 (also referred to as a content feed, newsfeed, activity feed, etc.), a "People you may know" webpage feature 403 that displays other users that may be known to the logged-in user, a "Who's viewed your profile" webpage feature 404 that displays a number of other users that have viewed the logged-in user's profile page (e.g., during a recent time interval), a "Jobs you may be interested in" webpage feature 405 displaying jobs that may be of interest to the logged in-user, a "companies you may want to follow" webpage feature 406 displaying companies that the logged-in user may wish to follow, a "groups you may like" webpage feature 407 displaying groups that may be of interest to the logged-in user, and so on. The webpage 400 illustrated in FIG. 4 is merely exemplary, and various embodiments described throughout are applicable to any type of webpage, such as any page associated with a social network service (e.g., a user profile page, a company page, a product page, an advertisement page, a group page, a jobs page, a help page, a friends/connections page, etc.).

The calculation module 202 of the feature touring system 200 may determine that a device is accessing a particular webpage (such as the social network service homepage 400 illustrated in FIG. 4) when a browser application installed on the device accesses a reference link (e.g., uniform resource locator or URL) corresponding to the webpage. The device may be any computing device such as, for example, a personal computer, a laptop computer, a notebook computer, a smart phone, a cell phone, a tablet computing device, and so on. The calculation module 202 may determine that the device is a "user device" that is associated with a particular user by, for example, determining that the browser application of that device has transmitted user login/authentication/identification information (e.g., usernames, passwords, etc.) associated with the user to a remote web server (such as a Web server associated with the social network service LinkedIn®). This may occur when, for example, the user enters their user name and password into the browser application installed on their user device in order to login to a social network service such as LinkedIn®, and the browser application provides such information to a remote Web server associated with the social network service in order to log the user into the social network service.

Referring back to FIG. 3, after the calculation module 202 determines (in operation 301) that a user device is accessing a webpage including various webpage features, in operation 302, the calculation module 202 calculates a personalized experience score corresponding to each of the various webpage features. According to an exemplary embodiment, each of the personalized experience scores may indicate an estimated or inferred level of experience, education, knowledge, familiarity, understanding, competence, or comfort that the user currently has with the corresponding webpage feature. For example, with reference to the webpage 400 illustrated in FIG. 4, the calculation module 202 may determine personalized experience scores indicating the users current experience level with each of the webpage features 401-407. In some embodiments, the personalized experience score may correspond to a number within a range of numbers (e.g., a number in the range 1-100, where 1 indicates that the user has a low inferred level of experience with the web page feature, and where 100 indicates that the user has a high inferred level of experience with the webpage feature, or vice versa). In some embodiments, the personalized experience score may correspond to a letter in an alphanumeric range (e.g., the letter in the alphabetical range A-Z, where Z indicates that the user has a low inferred level of experience with the web page feature, and A indicates that the user is a high inferred level of experience with the webpage feature, or vice versa). In some embodiments, the personalized experience score may correspond to one of "low" (indicating that the user has a low inferred level of experience with the webpage feature), "medium" (indicating that the user has moderate inferred level of experience with the webpage feature), "high" (indicating that the user has a high inferred level of experience with the webpage feature), and so on.

In some embodiments, when the user device of the user accesses the URL of any particular webpage, the calculation module 202 may access webpage feature information that identifies all of the webpage features on the accessed webpage. For example, FIG. 5 illustrates exemplary webpage feature information 500 that identifies various webpages and indicates, for each of the webpages, the webpage features present on that webpage, a release date of each of the webpage features, and a link to an interactive tour for each of the webpage features, as described in greater detail below. The exemplary webpage feature information 500 may be stored locally at, for example, the database 206 illustrated in FIG. 2, or may be stored remotely at a database, data repository, storage server, etc., that is accessible by the feature touring system 200 via a network (e.g., the Internet). Once the calculation module 202 has identified all the webpage features on the accessed webpage, the feature touring system 200 may proceed to generate the personalized experience scores corresponding to each of the webpage features. Examples of how the calculation module 202 may generate the personalized experience scores are described in more detail elsewhere in this disclosure.

Figure 6:
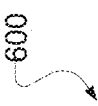
FIG. 6 illustrates exemplary personalized experience score information, according to various embodiments.

FIG. 6 illustrates exemplary personalized experience score information 600 including personalized experience scores for a given user for each of the webpage features 401-407 of the exemplary webpage 400. For example, the personalized experience score "99" for the "Activity stream" webpage feature 402 indicates that the given user has a high inferred level of experience with the "Activity stream" webpage feature 402. On the other hand, the personalized experience score "3" for the "Groups you may like" webpage feature 406 indicates that the user has a low inferred level of experience with the webpage feature 406. The exemplary personalized experience score information 600 may be stored locally at, for example, the database 206 illustrated in FIG. 2, or may be stored remotely at a database, data repository, storage server, etc., that is accessible by the feature touring system 200 via a network (e.g., the Internet).

Referring back to FIG. 3, after the calculation module 202 calculates (in operation 302) a plurality of personalized experience scores corresponding to each of the various webpage features, in operation 303, the calculation module 202 identifies one or more of the webpage features that the user is not experienced, familiar, or knowledgeable with. For example, the calculation module 202 may select the webpage features having "low" personalized experience scores (e.g., the X webpage features with the X lowest personalized experience scores, or all of the webpage features having personalized experience scores below a predetermined threshold, etc.). For example, with reference to the personalized experience score information 600 in FIG. 6, the calculation module 202 may identify the "People you may know" webpage feature, the "Who's viewed your profile" webpage feature, and the "Groups you may want to follow" webpage feature, as being webpage features that the user is not experienced with.

In operation 304 in FIG. 3, the tour module 204 displays the webpage that the user device was attempting to access (in operation 301). The tour module 204 also displays, on the webpage, user-selectable tour entry buttons (also referred to herein as "user-selectable tour entry user interface elements") for each of the webpage features that the user is not familiar with (which were identified in operation 303). Each of the tour entry buttons may include a link to information describing the specific webpage feature, such as an interactive tour of the specific webpage feature. Following on from the exemplary webpage in FIG. 4 and the exemplary personalized experience scores in FIG. 6, the tour module 204 may display the webpage 700 illustrated in FIG. 7, which is similar to the webpage 400 illustrated in FIG. 4. The tour module 204 displays tour entry buttons 701-703 for the webpage features that the user is not experienced with, including tour entry button 701 for the "People you may know" webpage feature, tour entry button 702 for the "Who's viewed your profile" webpage feature, and tour entry button 703 for the "Companies you may want to follow" webpage feature. As illustrated in FIG. 7, the tour entry buttons may be displayed in proximity to the portions of the webpage 400 where the corresponding webpage feature is located.

When the user selects any of the tour entry buttons 701-703, the user may be provided with information that enables the user to become more educated, experienced, familiar, comfortable, competent, or knowledgeable with the corresponding webpage feature. For example, each of the tour entry buttons 701-703 may include a link to information describing the specific webpage feature, such as a help page, instructions, a manual, or an interactive tour describing the specific webpage feature. For example, referring back to FIG. 5, the exemplary webpage feature information 500 indicates, for a given webpage, a link to an interactive tour for each of the webpage features. Thus, the tour entry buttons 701-703 may include links to the appropriate interactive tours identified in the webpage feature information 500.

According to various exemplary embodiments, a tour may be a set of steps to guide a user through a webpage feature, such as a set of caption boxes displayed in conjunction with various webpages. In some embodiments, the contents of each interactive tour identified in the webpage feature information 500 may be represented by metadata describing the properties of each interactive tour. For example, FIG. 8 illustrates tour metadata 800 defining an interactive tour, and includes information for each step of the tour, including the URL of a webpage for display during the tour, coordinates on this webpage where a caption may be displayed, various caption properties for the aforementioned caption (e.g., outline, shape, color, size, orientation, etc.), a title of the caption, a comment associated with the caption, and so on. The tour metadata 800 is merely exemplary, and other information may be included in the tour metadata, such as links to interactive content, animations, audio files, video files, etc. The metadata 800 may be translated into or represented by instructions or programming code in various computer programming languages (e.g., hypertext markup language (HTML), extensible markup language (XML), cascading style sheets (CSS), PHP, Java, JavaScript, JavaScript object notation (JSON), C, C++, Objective-C, etc.).

Figure 9:
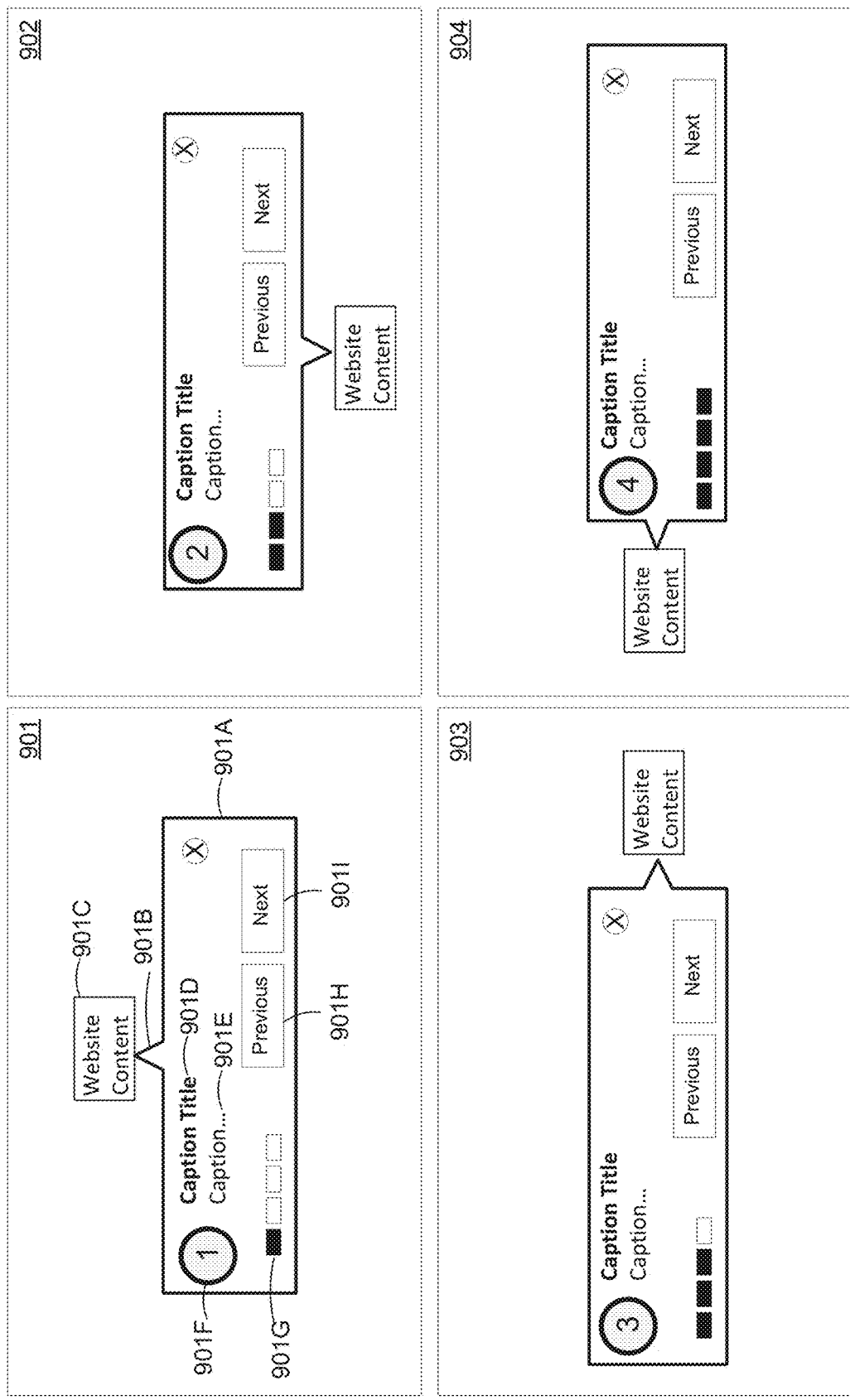
FIG. 9 illustrates steps of an exemplary interactive tour, according to various embodiments.

FIG. 9 illustrates an example of an interactive tour comprised of a number of steps that may be displayed when the user selects one of the core entry buttons 701-703. The interactive tour in FIG. 9 includes four steps, each of which may take place on a different webpage 901-904 (or on the same webpage). During the first step of the tour, a caption box 901A may be displayed on the webpage 901, whether caption box 901A includes an arrow 901B identifying a particular piece of content 901C on the webpage 901. The caption box 901A also includes a caption title 901D, caption content 901E, tour step indicators 901F and 901G, a "Previous" button 901H to go to a previous step of the tour (if applicable), and a "Next" button 901I to go to a next step in the tour (if applicable). Likewise, additional steps in the tour of FIG. 9 may include similar types of captions describing various pieces of website content on various webpages 902-904.

Various tours described throughout may include a series of sequential steps that take place one after the other in a fixed sequence, where such tours may be referred to as "linear tours". According to another exemplary embodiment, a tour may be comprised of a number of nonlinear steps that may occur in various alternative sequences or may occur in combination with each other. For example, when the user selects a tour entry button, multiple caption boxes (similar to caption box 901A in FIG. 9) identifying multiple pieces of website content on a single webpage may be displayed simultaneously. The user may click on any one of the caption boxes in order to learn more about various webpage features for webpage content.

Examples of various factors that the calculation module 202 may utilize to generate the personalized experience scores will now be described. In some embodiments, the calculation module 202 may calculate a personalized experience score for a particular webpage feature based on an age or release date of the corresponding webpage feature. For example, the calculation module 202 may consult the exemplary webpage feature information 500 (see FIG. 5) that identifies the release date/time for each webpage feature, and the calculation module 202 may compare this information to a predetermined date threshold (e.g., one day prior to the present day, one week prior to the present day, one month prior to the present day, etc.), in order to identify the webpage features that have been released recently. Thus, if the calculation module 202 determines, based on the website feature information 500, that a particular webpage feature has already been released for a long time (e.g., over a year), the calculation module 202 may generate a personalized experience score indicating that a user has a high inferred level of experience with the webpage feature. On the other hand, if the calculation module 202 determines that a particular webpage feature has only been released for a short time (e.g., a day, a week, a month, etc.), the calculation module 202 may generate a personalized experience score indicating that the user has a low inferred level of experience with the webpage feature In some embodiments, the calculation module 202 may calculate a personalized experience score for a particular webpage feature based on a count of previous user interactions with the webpage feature. For example, the calculation module 202 may access user interaction history data identifying, for a given user, the various webpage features on various webpages that the user has interacted with (e.g., clicked on, accessed, utilized, hovered over, etc.). FIG. 10 illustrates exemplary user interaction history data 1000 that identifies various users and lists, for each of the users, a history of various webpage features of various webpages that the user has accessed in the past. Thus, if the calculation module 202 determines, based on the user interaction history data 700, that a user has interacted with the particular feature more than a predetermined number of times, the calculation module 202 may generate a personalized experience score indicating that the user has a high inferred level of experience with the webpage feature. On the other hand, if the calculation module 202 determines that a user has interacted with the particular feature less than a predetermined number of times, the calculation module 202 may generate a personalized experience score indicating that the user has a low inferred level of experience with the webpage feature. The exemplary user interaction history data 700 may be stored locally at, for example, the database 206 illustrated in FIG. 2, or may be stored remotely at a database, data repository, storage server, etc., that is accessible by the feature touring system 200 via a network (e.g., the Internet).

In some embodiments, the calculation module 202 may calculate a personalized experience score for a particular webpage feature based on a count of previous user interactions with the corresponding webpage feature during a predetermined time period. For example, if the calculation module 202 determines, based on the user interaction history data 1000, that a user has interacted with the particular feature more than a predetermined number of times over a given time period (e.g., the last six months), the calculation module 202 may generate a personalized experience score indicating that the user has a high inferred level of experience with the webpage feature. On the other hand, if the calculation module 202 determines that a user has interacted with the particular feature less than a predetermined number of times over the given time period, the calculation module 202 may generate a personalized experience score indicating that the user has a low inferred level of experience with the webpage feature.

In some embodiments, the calculation module 202 may calculate a personalized experience score for a particular webpage feature based on a count of previous user interactions with an interactive tour describing the corresponding webpage feature. For example, the exemplary user interaction history data 700 identifies various users and lists, for each of the users, a history of various interactive tours of various webpage features that the user has accessed (e.g., started, completed, etc.) in the past. Thus, if the calculation module 202 determines, based on the user interaction history data 1000, that a user has interacted with a tour of a particular webpage feature more than a predetermined number of times, the calculation module 202 may generate a personalized experience score indicating that the user has a high level of experience with that webpage feature. On the other hand, if the calculation module 202 determines that a user has interacted with a tour of a particular webpage feature less than a predetermined number of times, the calculation module 202 may generate a personalized experience score indicating that the user has a low inferred level of experience with that webpage feature.

In some embodiments, the calculation module 202 may calculate a personalized experience score for a particular webpage feature based on a count of previous user interactions with an interactive tour describing the corresponding webpage feature during a predetermined time period. For example, if the calculation module 202 determines, based on the user interaction history data 700, that a user has interacted with a tour of a particular webpage feature more than a predetermined number of times over a given time period (e.g., the last six months), the calculation module 202 may generate a personalized experience score indicating that the user has a high inferred level of experience with the webpage feature. On the other hand, if the calculation module 202 determines that a user has interacted with a tour of a particular webpage feature less than a predetermined number of times over the given time period, the calculation module 202 may generate a personalized experience score indicating that the user has a low inferred level of experience with the webpage feature.

In some embodiments, the calculation module 202 may calculate a personalized experience score for a particular webpage feature based on whether the corresponding webpage feature is related to a user profile attribute of the user. For example, some types of webpage features may be more suited to certain types of users, such as users with certain types of experience, education, skills, etc. For example, a webpage feature such as "how to add patents to your profile" or "how to add programming languages to your profile" may be more applicable to developers or engineers than other users. As another example, a webpage feature on "how to add a portfolio of artwork/photographs to your profile" may be more applicable to artists or photographers than other users. As another example, a webpage features such as "other marketers as you may know", "marketing jobs you may be interested in", "marketing groups you may like", etc., may be more applicable to marketers than other users. Thus, if the calculation module 202 determines that a given webpage feature is more suitable or applicable to a certain type of user (e.g., a user having a certain experience attribute, education attribute, skill attribute, and so on), then the calculation module 202 may manipulate the personalized experience scores for users having those user profile attribute to indicate that the user may require more experience with this webpage feature.

Another example of the user profile attribute is an account level/status that a user may have on a social network service. For example, if the user has a premium/upgraded account that provides the user with access to certain premium/upgraded features, then the calculation module 202 may manipulate the personalized experience scores for this user to indicate that the user may require more instruction for these webpage features. On the other hand, if the user has a basic account, then the calculation module 202 may manipulate the personalized experience scores for this user to indicate that the user does not require instruction for the premium/upgraded webpage features. Other examples of user profile attributes include name, title, location, e-mail address, telephone number, profile picture, experience, education, skills, multimedia, and so on. Such profile attributes may be present in user profile data for each user of a social network service.

Figure 11:
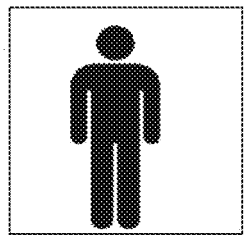
FIG. 11 illustrates an exemplary user profile page, according to various embodiments.

User profile attributes may also be present in a user profile page of the user on the social network service. An example of a user profile page 1100 of a user (e.g., a LinkedIn® page of a user "Jane Doe") is illustrated in FIG. 11. As seen in FIG. 11 the user profile page 1100 includes identification information 1101, such as the user's name ("Jane Doe"), user's current employment position, ("Computer Programmer at XYZ"), and geographic address/location information ("San Francisco Bay Area"). The user's profile page also includes a photo area 1102 for displaying a photograph of the user. Further, the user profile page includes various sections (also known as fields). For example, user profile page 1100 includes an experience section 1111 including listings of experience positions (e.g., employment/volunteer experience position 1112) of the user, and an education section 1121 including listings of educational credentials of the user (e.g., university degree or diploma 1122 earned or currently being earned by the user). As illustrated in FIG. 11, the profile page 1100 includes tour entry buttons 1150 and 1151 for accessing interactive tours describing various webpage features (e.g., an "Add skills" webpage feature and an "Add publications" web page feature) of the user profile page 1100. According to various exemplary embodiments, the tour module 204 may display the tour entry buttons 1150 and 1151 because of various user profile attributes of the user profile page 1100 (e.g., experience position 1112 or education position 1122) which indicate that the webpage features of "Add skills" and "Add publications" are suitable for the user "Jane Doe", and which indicate that the user should learn more about these webpage features.

According to various exemplary embodiments, the calculation module 202 may generate personalized experience scores based on a combination of any of the aforementioned factors (e.g., a combination of any of the age/release date of the webpage feature, the number of times the user has previously accessed or recently accessed the webpage feature, the number of times the user has previously accessed or recently accessed the tour for the webpage feature, whether the webpage feature is related to a user profile attribute of the user, etc.).

According to various exemplary embodiments, the tour module 204 is configured to adjust the display of the tour entry buttons on a webpage at various points in time, such as before a user has initiated a tour, while the user is taking a tour, after the user has completed the tour, and so on. For example, the user profile page 700 in FIG. 7 includes tour entry buttons 701-703 and, as described above, if the user selects one of the tour entry buttons 701, the user will initiate the corresponding interactive tour. In some embodiments, while the user is taking the tour, the tour module 204 may remove any tour entry user buttons from display during the tour. For example, if one of the steps of the tour happens to include the webpage 700, then the tour module 204 will remove the tour entry buttons 701-703 from display during this step of the tour. Once the user actually completes the tour and is returned to the webpage 700, the tour module 204 may remove the tour entry button 701 corresponding to the tour that the user just completed, while displaying the other tour entry buttons 702 and 703 for the interactive tours that the user has yet to take.

Figure 12:
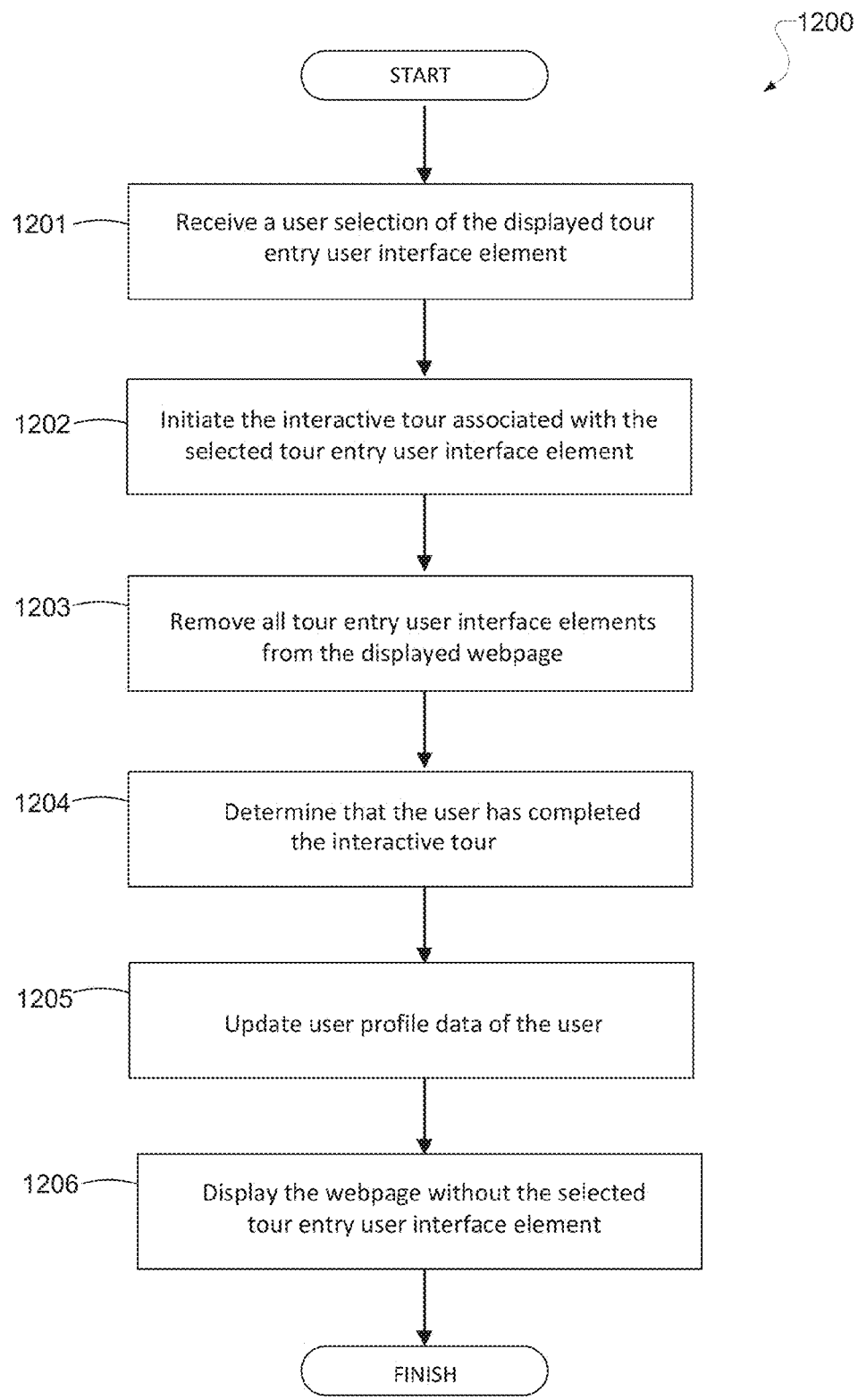
FIG. 12 is a flowchart illustrating an example method, according to various embodiments.

FIG. 12 is a flowchart illustrating an example method 1200, consistent with various embodiments described above. The method 1200 may be performed at least in part by, for example, the feature touring system 200 illustrated in FIG. 2 (or an apparatus having similar modules, such as client machines 110 and 112 or application server 118 illustrated in FIG. 1). In operation 1201, the tour module 204 receives a user selection of a tour entry user interface element displayed on the webpage. For example, the tour module 204 may receive the user selection of the tour entry button 701 illustrated in FIG. 7. In operation 1202, the tour module 204 initiates the interactive tour associated with the selected tour entry user interface element. For example, the tour module 204 initiates an interactive tour for the webpage feature "People you may know" illustrated in FIG. 7. (According to various alternative embodiments, when the user selects a tour entry button, the user is provided with introductory information describing the tour (e.g., via a pop-up tour introduction caption box), without the tour itself actually being initiated. The tour introduction caption box may itself include a "start tour button" that, when selected by the user, then causes the tour can be initiated). In operation 1203, the tour module 204 removes all tour entry user interface elements from any displayed webpage while the user is participating in the interactive tour. In operation 1204, the tour module 204 determines that the user has completed the interactive tour. In operation 1205, the tour module 204 updates user profile data of the user to indicate that the user has completed the interactive tour. For example, the tour module 204 may update the user interaction history data 1000 illustrated in FIG. 10. In operation 1206, the tour module 204 returns the user to the original webpage. More specifically, the tour module 204 may display this webpage without the tour entry user interface element for the tour that the user just completed, but may include other tour entry user interface elements.

Figure 13:
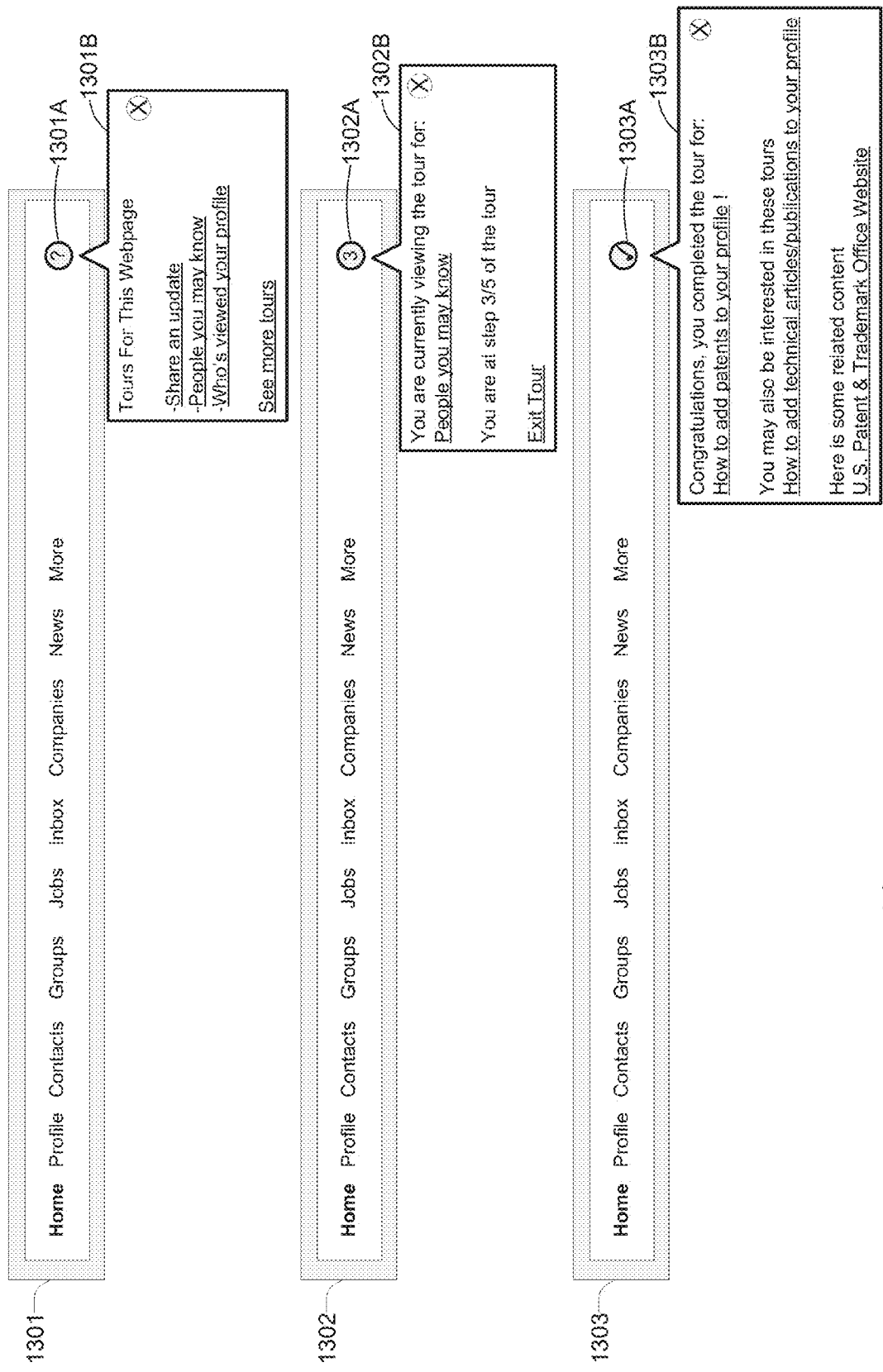
FIG. 13 illustrates examples of various user-selectable help user interface elements, according to various embodiments.

According to various exemplary embodiments, the tour module 204 is configured to display a "quick help" button (also referred to herein as a "user-selectable help user interface element") that provides the user with different kinds of tour related information at various points in time, such as before the user has initiated a tour, while the user is taking a tour, after the user has completed the tour, and so on. For example, FIG. 13 illustrates a navigation pane 1301 that may be displayed in conjunction with a webpage (such as the webpage 700) before the user has initiated a tour. The navigation pane 1301 includes a quick help button 1301A with the symbol of a question mark. If the user selects the quick help button 1301A, the tour module 204 may display the caption 1301B that describes various tours available for the current webpage. For example, the caption 1301B may display the tours for webpage features that the user has limited experience with (e.g., tours for which tour entry buttons are displayed). If the user clicks on the "See more tours" link, the tour module 204 may display all the available tours for the current webpage. FIG. 13 also illustrates a navigation pane 1302 that may be displayed in conjunction with a webpage (such as the webpage 700) after the user has initiated a tour by selecting one of the tour entry buttons 701-703. The navigation pane 1302 includes a quick help button 1302A with indicia indicating the user's progress in the tour (e.g., a "3" to indicate that the user is at a third step of the tour). If the user selects the quick help button 1302A, the tour module 204 may display the caption 1302B that describes the user's progress in completing the tour, such as the current step of the tour and the total number of steps in the tour. FIG. 13 also illustrates a navigation pane 1303 that may be displayed in conjunction with a webpage (such as the webpage 700) after the user has completed a tour. The navigation pane 1303 includes a quick help button 1303A with a checkmark. If the user selects the quick help button 1303A, the tour module 204 may display the caption 1303B that describes information related to the tour that the user just completed, such as other tours that the user may be interested in, or links to other webpages describing content that may be related to the tour and/or of interest to the user, and so on. The quick help buttons illustrated in FIG. 13 are merely exemplary, and may include different types of content or take on different appearances. For example, the quick help buttons 1301A-1303A may include a profile picture of the user. Similarly, the captions 1301B-1303B are exemplary and may include other types of information.

Figure 14:
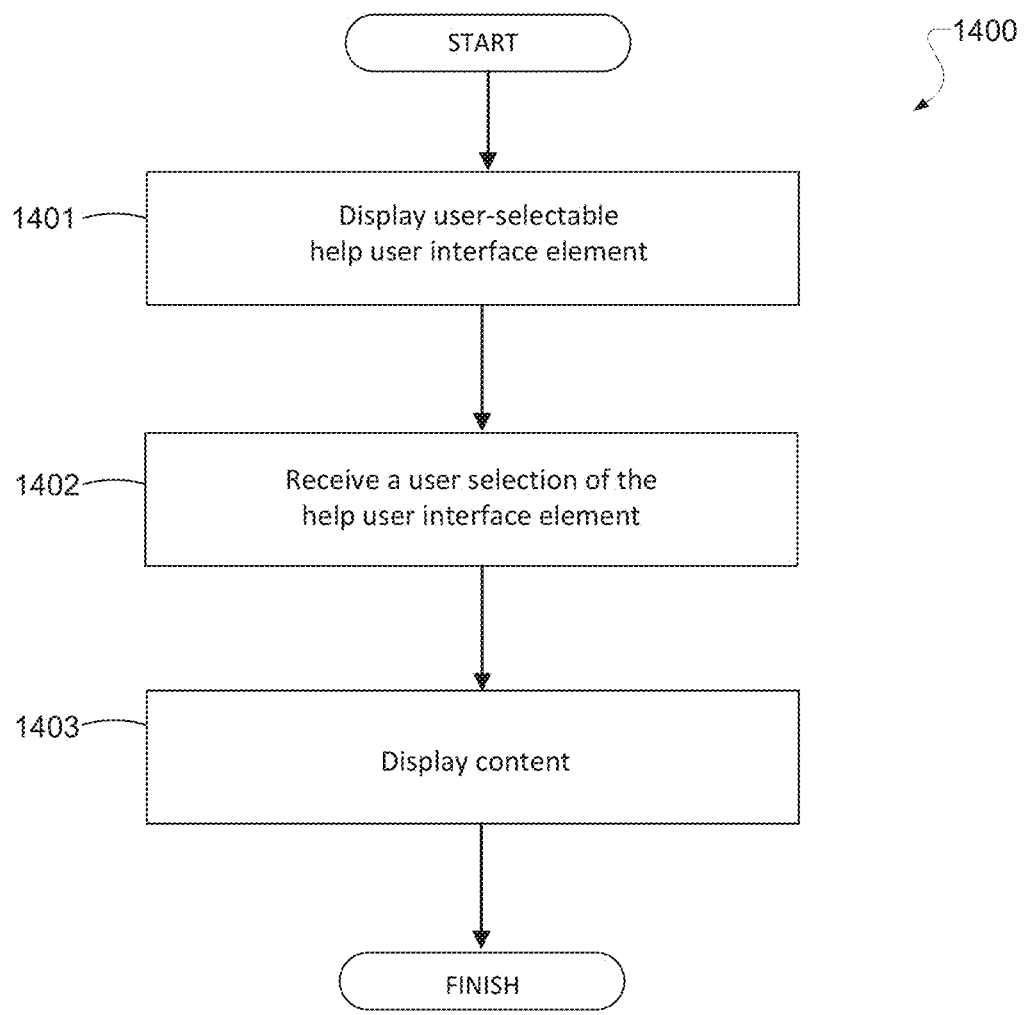
FIG. 14 is a flowchart illustrating an example method, according to various embodiments.

FIG. 14 is a flowchart illustrating an example method 1400, consistent with various embodiments described above. The method 1400 may be performed at least in part by, for example, the feature touring system 200 illustrated in FIG. 2 (or an apparatus having similar modules, such as client machines 110 and 112 or application server 118 illustrated in FIG. 1). In operation 1401, the tour module 204 displays, on a webpage, a user-selectable help user interface element. In operation 1402, the tour module 204 receives a user selection of the help user interface element. In operation 1403, the tour module 204 displays various types of content based on the user selection received in operation 1402. For example, if the user selection in operation 1402 was received before an interactive tour is initiated, then in operation 1403, the tour module 204 may display tour summary information describing one or more interactive tours available for the webpage features of the webpage. As another example, if the user selection in operation 1402 was received while the interactive tour is being displayed, then in operation 1403, the tour module 204 may display tour progress information indicating the user's current progress in completing the interactive tour. As another example, if the user selection in operation 1402 was received after the interactive tour is completed, then in operation 1403, the tour module 204 may display recommendations for related content that is related to the specific webpage feature that was described in the completed interactive tour.

Figure 15:
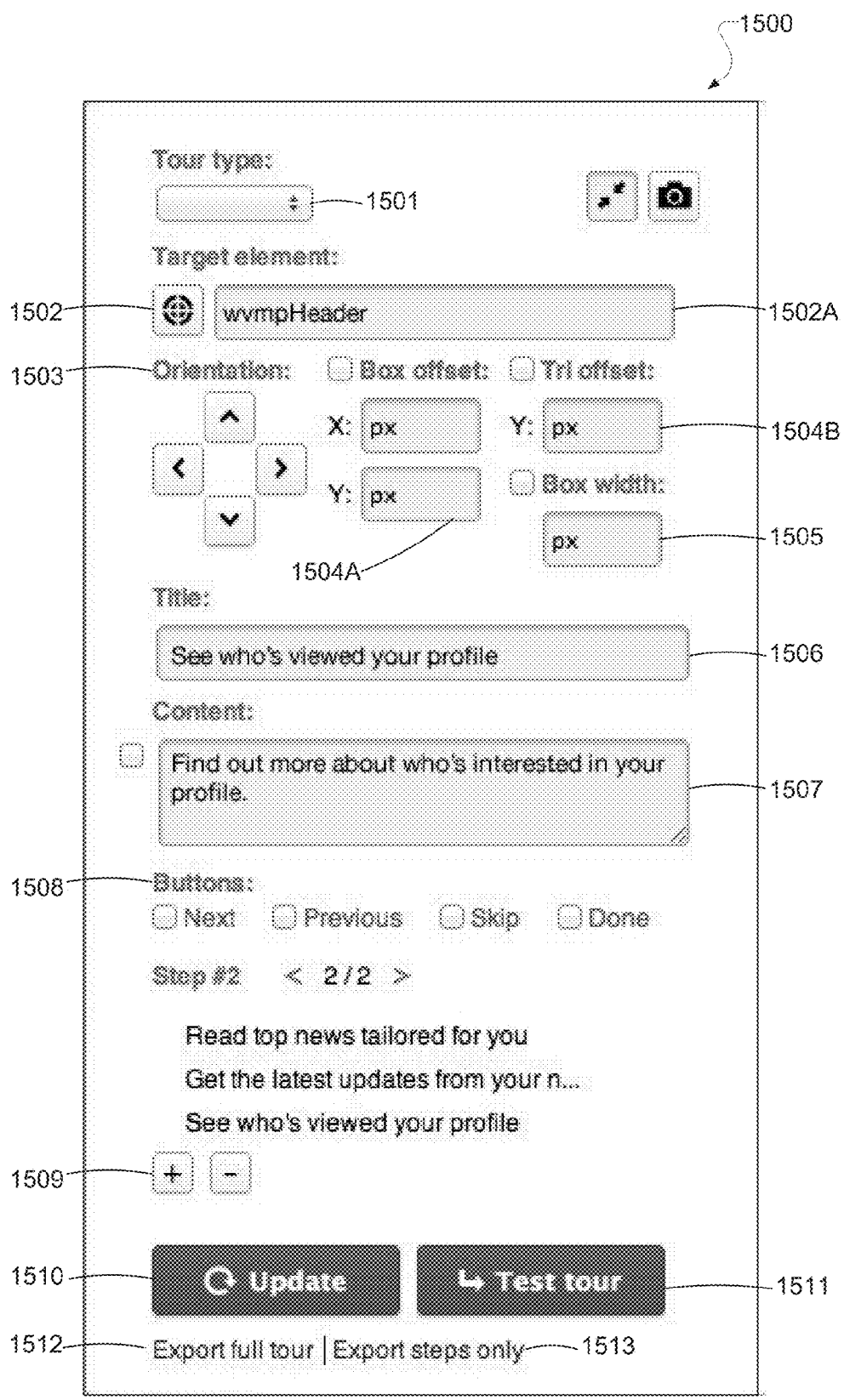
FIG. 15 illustrates an exemplary portion of a tour generation user interface, according to various embodiments.

According to various exemplary embodiments, the tour module 204 is configured to enable the user to easily generate an interactive tour, such as an interactive tour described above in conjunction with FIGS. 8 and 9. For example, if the user indicates that they wish to generate a tour, the tour module 204 may display the interactive tour generation interface 1500 illustrated in FIG. 15. Using drop-down menu 1501, the user can select a tour type, such as an interactive tour, an audio tour, video tour, a caption tour (default), and so on. The user can then utilize user interface elements 1502-1509 to easily generate each specific step in a tour. For example, when the user selects the target element button 1502, the user can place the cursor on any portion of the current webpage and then click on this portion in order to indicate that this is where caption box will be placed. The webpage including the target element may be specified in field 1502A. If the user selects the orientation buttons 1503, the user can select the orientation of the caption box, such as arrow facing up (e.g., see 901 in FIG. 9), arrow facing down (e.g., see 902 and FIG. 9), arrow facing left (e.g., see 904 in FIG. 9), and arrow facing right (e.g., see 903 in FIG. 9). By selecting the box offset field 1504A, the user can adjust the offset of the caption box from the target element. By selecting the triangle offset field 1504B, the user can adjust the offset of the triangle/arrow of the caption box from the central portion of the caption box. If the user selects the box width field 1505, the user can adjust the width of the caption box. The user can utilize the title field 1506 and content fields 1507 in order to enter information for the title and the caption of the caption box (see FIG. 9). Using the fields 1508, the user can select the buttons to be included in the caption box (e.g., "Previous" and "Next" as illustrated in FIG. 9). Using the buttons 1509, the user can add another step, or remove the current step. When the user selects the update button 1510, the various user inputs are saved. When the user selects the test tour button 1511, a sample of the tour is displayed. When the user selects the "export full tour" button 1512, the tour module 204 generates and displays programming code corresponding to the entire tour. On the other hand, when the user selects the "export steps only" button 1513, the tour module 204 generates and displays programming code corresponding to the current step of the tour that is currently defined in the user interface 1500. In some embodiments, the aforementioned programming code may correspond to tour metadata 800 that is translated into or represented by instructions in various computer programming languages (e.g., hypertext markup language (HTML), extensible markup language (XML), cascading style sheets (CSS), PHP, Java, JavaScript, JavaScript object notation (JSON), C, C++, Objective-C, etc.). Thus, the user can paste the programming code into the appropriate webpage composer application in order to generate a webpage link to the interactive tour content on a webpage.

While various examples herein refer to webpage features of a browser-accessible webpages, the exemplary embodiments described throughout are applicable to other types of content that may include various features. For example, the embodiments described throughout are applicable to mobile applications installed on a mobile device (e.g., a smart phone, a cell phone, a tablet computing device, etc.), where the mobile application (or various pages, displays, user interfaces, etc., of the mobile application) include various mobile application features.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 16:
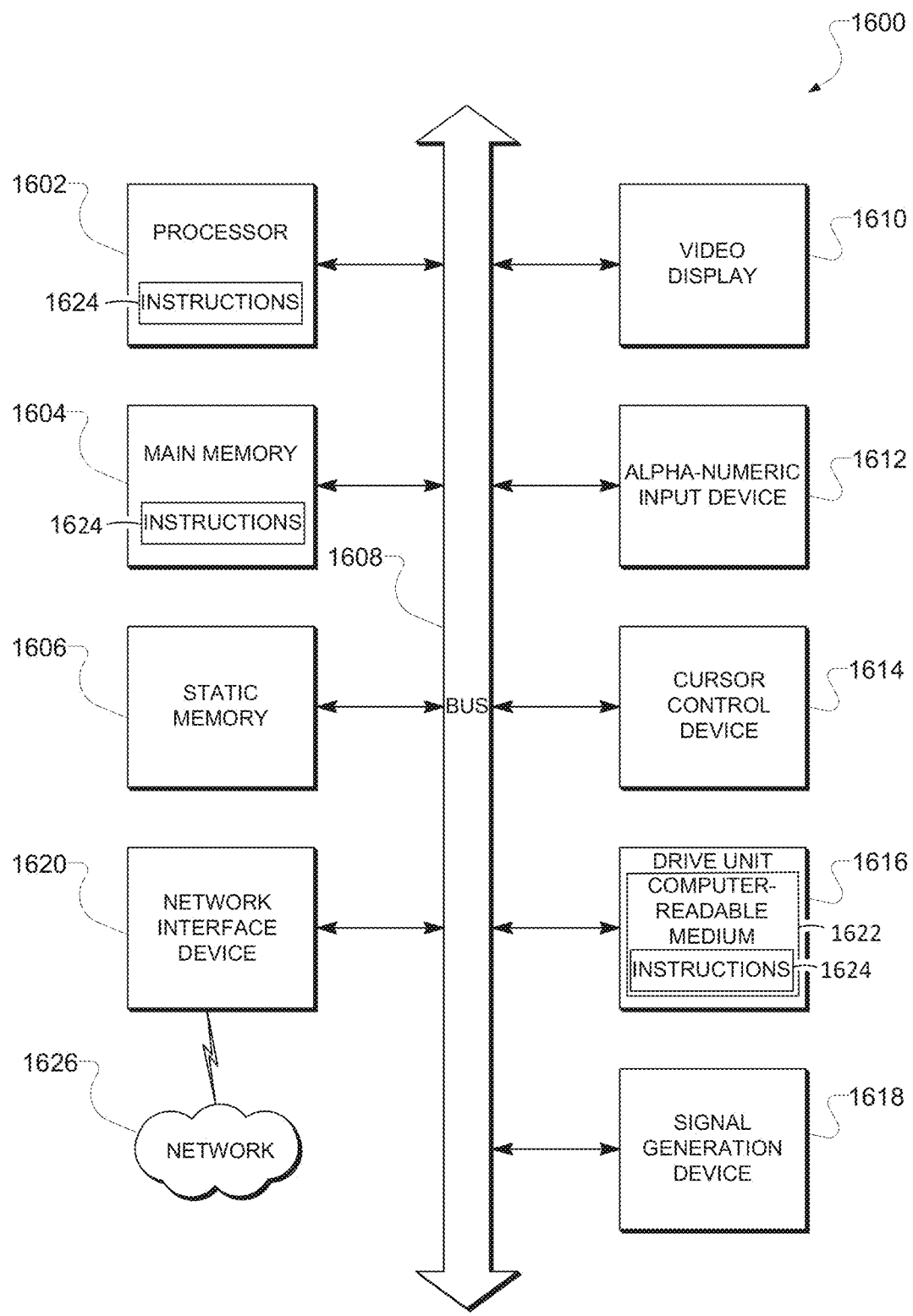
FIG. 16 is a diagrammatic representation of a machine in the example form of a computer system within which a set of instructions, for causing the machine to perform any one or more of the methodologies discussed herein, may be executed.

FIG. 16 is a block diagram of machine in the example form of a computer system 1600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard or a touch-sensitive display screen), a user interface (UI) navigation device 1614 (e.g., a mouse), a disk drive unit 1616, a signal generation device 1618 (e.g., a speaker) and a network interface device 1620.

Machine-Readable Medium

The disk drive unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    determining that a device is accessing a webpage including a plurality of webpage features;
    determining that the device is associated with a user, based on the device transmitting identification information to a remote web server;
    in response to the device accessing the webpage and determining the device is associated with the user, calculating, using one or more processors, a plurality of personalized experience scores for the user corresponding to the plurality of webpage features, each of the personalized experience scores indicating an inferred current experience level of the user with the corresponding webpage feature and being determined based in part on an association of the corresponding webpage feature to a user profile attribute of the user, the user profile attribute independent of usage of the webpage;
    in response to calculating the plurality of personalized experience scores, comparing the plurality of personalized experience scores associated with the plurality of webpage features to determine a set of lowest personalized experience scores for the user;
    in response to determining the set of lowest personalized experience scores, identifying, based on the set of lowest personalized experience scores, a specific one of the webpage features, the personalized experience scores indicating that the user has a relatively low current experience level with the specific webpage feature; and
    in response to identifying the specific one of the webpage features, displaying, via a user interface in the device, the webpage and a user-selectable tour entry user interface element including a link to an interactive tour describing the specific webpage feature.

2. The method of claim 1, wherein the tour entry user interface element is displayed in proximity to a portion of the webpage that includes the specific webpage feature.

3. The method of claim 1, wherein at least one of the personalized experience scores is calculated based in part on a count of previous user interactions with the corresponding webpage feature.

4. The method of claim 1, wherein at least one of the personalized experience scores is calculated based in part on a count of previous user interactions with the corresponding webpage feature during a predetermined time period.

5. The method of claim 1, wherein at least one of the personalized experience scores is calculated based in part on a count of previous user interactions with an interactive tour describing the corresponding webpage feature.

6. The method of claim 1, wherein the user profile attribute is at least one of an education position of the user, an image of the user, and a skill of the user.

7. The method of claim 1, further comprising:
    receiving a user selection of the displayed tour entry user interface element; and
    initiating the interactive tour associated with the selected tour entry user interface element.

8. The method of claim 7, further comprising
    removing any tour entry user interface elements from the displayed webpage while the user is participating in the interactive tour.

9. The method of claim 7, further comprising
    determining that the user has completed the interactive tour;
    updating user profile data of the user, in response to determining that the user has completed the interactive tour, the updated user profile data indicating that the user has completed the interactive tour; and
    displaying the webpage without the tour entry user interface element.

10. The method of claim 1, further comprising:
    displaying, on the webpage, a user-selectable help user interface element, wherein the help user interface element includes indicia indicating the user's current progress in completing an interactive tour.

11. The method of claim 1, further comprising:
    displaying, on the webpage, a user-selectable help user interface element;
    receiving a user selection of the help user interface element before the interactive tour is initiated; and
    displaying, in response to receiving the user selection of the help user interface element, tour summary information describing one or more interactive tours available for the webpage features of the webpage.

12. The method of claim 1, further comprising:
    displaying, on the webpage, a user-selectable help user interface element;
    receiving a user selection of the help user interface element while the interactive tour is being displayed; and displaying, in response to receiving the user selection of the help user interface element, tour progress information indicating the user's current progress in completing the interactive tour.

13. The method of claim 1, further comprising:
displaying, on the webpage, a user-selectable help user interface element;
receiving a user selection of the help user interface element after the interactive tour is completed; and
displaying, in response to receiving the user selection of the help user interface element, recommendations for related content that is related to the specific webpage feature described in the completed interactive tour.

14. An apparatus comprising:
one or more processors,
a non-transitory machine-readable storage medium having embodied thereon instructions executable by the one or more processors which, when executed, cause the one or more processor to perform operations comprising:
determining that a device is accessing a webpage including a plurality of webpage features;
determining that the device is associated with a user, based on the device transmitting identification information to a remote web server;
in response to the device accessing the webpage and determining the device is associated with the user, calculating, using one or more processors, a plurality of personalized experience scores for the user corresponding to the plurality of webpage features, each of the personalized experience scores indicating an inferred current experience level of the user with the corresponding webpage feature and being determined based in part on an association of the corresponding webpage feature to a user profile attribute of the user, the user profile attribute independent of usage of the webpage;
in response to calculating the plurality of personalized experience scores, comparing the plurality of personalized experience scores associated with the plurality of webpage features to determine a set of lowest personalized experience scores for the user:
in response to determining the set, of lowest personalized experience scores, identifying, based on the set of lowest personalized experience scores, a specific one of the webpage features, the personalized experience scores indicating that the user has a relatively low current experience level with the specific webpage feature; and
in response to identifying the specific one of the webpage features, displaying, via a user interface in the device, the webpage and a user-selectable tour entry user interface element including a link to an interactive tour describing the specific webpage feature.

15. The apparatus of claim 14, wherein the operations further cause the one or more processors to:
receive a user selection of the displayed tour entry user interface element; and
initiate the interactive tour associated with the selected tour entry user interface element.

16. The apparatus of claim 14, wherein the operations further cause the one or more processors to:
determine that the user has completed the interactive tour;
update user profile data of the user, in response to determining that the user has completed the interactive tour, the updated user profile data indicating that the user has completed the interactive tour; and
prevent the tour entry user interface element from being displayed on the webpage, in response to determining that the user has completed the interactive tour.

17. A non-transitory machine-readable storage medium having embodied thereon instructions executable by one or more machines to perform operations comprising:
determining that a device is accessing a webpage including a plurality of webpage features;
determining that the device is associated with a user, based on the device transmitting identification information to a remote web server;
in response to the device accessing the webpage and determining the device is associated with the user, calculating, using one or more processors, a plurality of personalized experience scores for the user corresponding to the plurality of webpage features, each of the personalized experience scores indicating an inferred current experience level of the user with the corresponding webpage feature and being determined based in part on an association of the corresponding webpage feature to a user profile attribute of the user, the user profile attribute independent of usage of the webpage;
in response to calculating the plurality of personalized experience scores, comparing the plurality of personalized experience scores associated with the plurality of webpage features to determine a set of lowest personalized experience scores for the user;
in response to determining the set of lowest personalized experience scores, identifying, based on the set of lowest personalized experience scores, a specific one of the webpage features, the personalized experience scores indicating that the user has a relatively low current experience level with the specific webpage feature; and
in response to identifying the specific one of the webpage features, displaying, via a user interface in the device, the webpage and a user-selectable tour entry user interface element including a link to an interactive tour describing the specific webpage feature.

18. The storage medium of claim 17, wherein the operations further comprise:
receiving a user selection of the displayed tour entry user interface element; and
initiating the interactive tour associated with the selected tour entry user interface element.

* * * * *